MEMORY MATRICES INCLUDING MAGNETIC CORES

Filed March 28, 1956 2 Sheets-Sheet 1

INVENTOR
JACOB FREDRIK KLINKHAMER

BY Fred M. Vogel
AGENT

INVENTOR
JACOB FREDRIK KLINKHAMER

BY Fred M. Vogel
AGENT

United States Patent Office 3,105,959
Patented Oct. 1, 1963

3,105,959

MEMORY MATRICES INCLUDING MAGNETIC CORES

Jacob Fredrik Klinkhamer, Eindhoven, Netherlands, assignor, by mesne assignments, to North American Philips Company, Inc., New York, N.Y., a corporation of Delaware Filed Mar. 28, 1956, Ser. No. 574,411
Claims priority, application Netherlands Apr. 7, 1955
16 Claims. (Cl. 340—174)

This invention relates to memory matrices comprising a plurality of static magnetic memory elements arranged in rows and columns, the memory elements of each row being inductively coupled with a common input conductor and the memory elements of each column being inductively coupled with another common input conductor.

In known embodiments, the static magnetic memory elements comprise an annular core of material having a magnetisation characteristic as far as possible rectangular, which core comprises the required input and output windings. The polarisation condition of the remanent flux is determinative of information supplied to the memory element. This information, which is worded in a binary code, is supplied to the magnetic circuit in the form of current pulses flowing through one or more conductors coupled to the memory element.

In memory matrices constituted by known devices, the coded information is registered in a determined memory element, starting from an initial condition, which is the same for all elements, by supplying if necessary a current pulse to the input conductor of the row associated with this memory element and to the input conductor of the column associated with this element. The value of these current pulses is chosen to be such that they can together bring the condition of remanence of the core from one polarity into the other, but that the other memory elements present in the row and column concerned, which elements are thus excited only by a single current pulse, cannot change their condition of polarisation.

Reading out the information from a given memory element is effected by supplying to the said two input conductors a current pulse having a value corresponding to that of the current pulses which may be used in registering. A current pulse occurs across an output conductor coupled inductively with all memory elements, which current pulse is large or small dependent upon whether the memory element concerned occupies one condition of remanence or the other, the value of said current pulse thus being an indication of the information contained in the memory element.

Such memory matrices have several disadvantages. The characteristic curves of the various cores must be substantially rectangular for proper operation of the matrix and furthermore be substantially identical, the value of the current pulses is comparatively critical and the output voltages which occur across those memory elements which are excited only by a single current pulse have been found to interfere with the operation of the matrix. The registering and the reading out of the various memory elements can take place only in succession and furthermore the information contained in the memory elements is destroyed during reading out.

The object of the invention is to considerably increase the reliability of operation of such memory matrices and mitigate the above-mentioned disadvantages.

For this purpose, a memory matrix according to the invention has the characteristic that each memory element comprises two cores of highly remanent ferromagnetic material, the ratio between the remanent flux and the saturation flux of which approaches as closely as possible the value 1, and that one core is inductively coupled with at least one input conductor associated with the row in which the memory element is located and the other core is inductively coupled with the input conductor associated with the column in which the memory element is located, the two cores also being inductively coupled together by means of a separate winding.

In order that the invention may be readily carried into effect, it will now be described, by way of example, with reference to the accompanying drawings.

Figure 1:
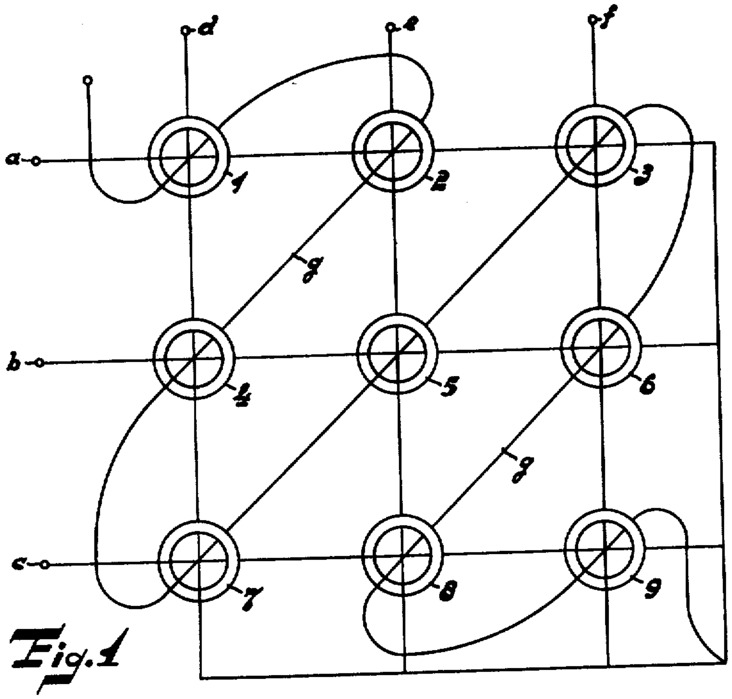
FIG. 1 shows a memory matrix built up in known manner from a two-dimensional pattern of annular cores.

In the memory matrix shown in FIG. 1, the various static magnetic memory elements are built up in known manner from an annular core of highly remanent material having a substantially rectangular magnetisation characteristic. The various cores are arranged after a two-dimensional pattern, each core, together with the associated current conductors, constituting a static magnetic memory element.

Figure 2:
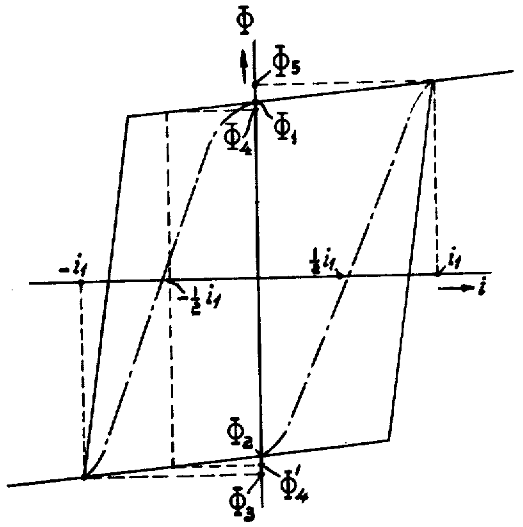
FIG. 2 shows a magnetisation characteristic of the cores as is desirable for such use.

FIG. 2 shows in full lines the hysteresis loop of such a core, in which the flux $\Phi$ is plotted as a function of the current $i$ which traverses a conductor coupled to the core. The term "magnetisation characteristic substantially rectangular" is to be understood to mean a characteristic curve in which the ratio between the flux $\Phi_4$ which occurs when $i=-\frac{1}{2}i_1$ (see FIG. 2) and the flux $\Phi_5$, which occurs when $i=i_1$, is substantially equal to unity. In practice, this ratio lies between 0.7 and 1. When $i=0$, two conditions of remanence exist, viz. the condition of polarisation $\Phi_1$ and the condition of polarisation $\Phi_2$. The condition $\Phi_1$ corresponds, for example, to "1" of the coded information and $\Phi_2$ corresponds to "0." Assuming the circuit to occupy the condition $\Phi_2$, a negative current pulse supplied to the current conductor connected to the core and having an absolute value $i_1$, produces in the core variations in flux $\Phi_3-\Phi_2$ and $\Phi_2-\Phi_3$, leading to voltages across another conductor connected to the core. If the circuit occupies the condition $\Phi_1$, a negative current pulse supplied to the first-mentioned current conductor produces a flux variation $\Phi_3-\Phi_1$ when the flank of this current pulse rises and produces a flux variation $\Phi_2-\Phi_3$ when the flank goes down, thus also resulting in voltages across the other conductor, of which the first voltage peak which occurs when the flank of the current pulse rises is considerably larger than the first voltage peak which occurs when the circuit occupies the condition $\Phi_2$. It is to be noted in this connection, that, when the pulse has the indicated value, viz. $i_1$, the circuit always assumes the condition $\Phi_2$ after a negative current pulse has been supplied to the first-mentioned conductor, which condition thus corresponds to "0" of the coded information. The registering of a "1," which means that the circuit is caused to assume the condition $\Phi_1$, is effected by supplying to the first-mentioned conductor a positive current pulse having a value at least equal to $i_1$.

The difference between a "1" and a "0" in reading out is thus based upon the difference between the voltage peaks across the said other conductor, which difference is attributable to the difference in flux variations $\Phi_3-\Phi_1$ and $\Phi_3-\Phi_2$.

The cores 1 to 9 are coupled together by means of input windings *a* to *f* and the output winding *g*, which windings in FIG. 1 are formed as single conductors drawn only once through the ring constituted by such a core.

Starting from the case in which all cores 1 to 9 occupy the condition $\Phi_2$, the registration of a "1," characterized by the condition $\Phi_1$, in a determined core is effected by supplying a current pulse having a value $\frac{1}{2}i_1$ (see FIG. 2) to each of the input conductors coupled to this core. Thus, in 8, a "1" is registered by leading a pulse through current conductors *e* and *c*, the cores 2, 5, 7 and 9 then being excited by one current pulse $\frac{1}{2}i_1$. However, this current pulse is precisely too small (with proper choice of the magnetisation characteristic) to bring about transition from $\Phi_2$ to $\Phi_1$. It will be evident that in this case the "registration" of a "0" is simply effected by keeping the core in the initial condition.

The reading out is effected in a similar manner as described with reference to FIG. 2, except that the reading out pulse $-i_1$ is now constituted by two current pulses of a value $-\frac{1}{2}i_1$ occurring simultaneously in two conductors.

As previously mentioned with reference to FIG. 2, the flux variation $\Phi_3-\Phi_2$ is not zero; similarly, the flux variations $\Phi_4-\Phi_1$ and $\Phi'_4-\Phi_2$ are not zero, so that the cores 2, 5, 7, 9, which are excited by a current pulse $-\frac{1}{2}i_1$, also produce voltages across the reading out conductor *g*. These unwanted voltages influence the value of the desired voltage which occurs across the conductor *g*, so that the difference between a "0" and a "1" is often difficult to ascertain, as is well-known. By the use of cores having a magnetisation characteristic which is substantially rectangular, and by suitable choice of the winding direction of the conductor *g* with respect to the various cores (see FIG. 1) the influence of these unwanted voltages may be considerably reduced, as is well-known, provided that the cores have magnetisation characteristics which are, in addition, substantially identical.

Furthermore, it has been found in practice that the value $i_1$ is comparatively critical. When $i_1$ is unduly high, a core will pass from one condition of remanence to the other with a current pulse having a value of $\frac{1}{2}i_1$, and when $i_1$ is unduly small, the core keeps in the same condition of remanence even with a current pulse of said value (and naturally of correct polarity).

It will be evident from the foregoing that the several memory elements can be read out only in succession and that furthermore the information contained in the memory elements is destroyed or read-out.

Figure 3:
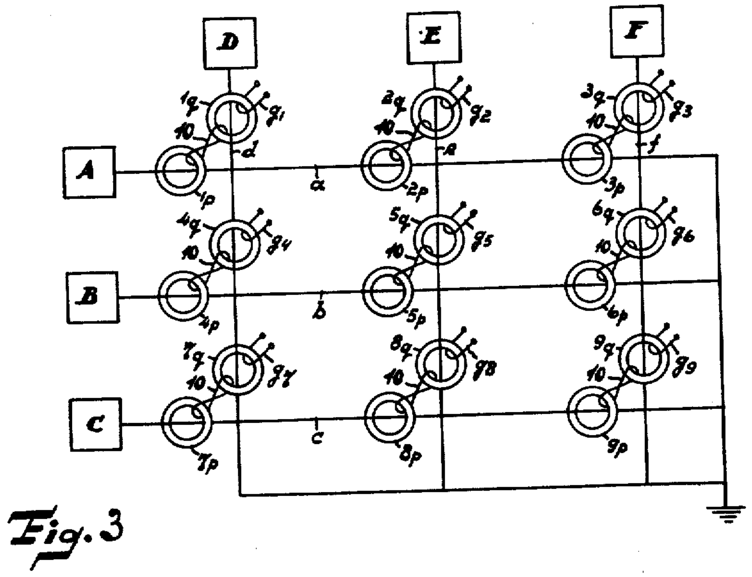
FIG. 3 shows diagrammatically one embodiment of a memory matrix according to the invention.

FIG. 3 shows diagrammatically one embodiment of a memory matrix according to the invention. Each memory element comprises two cores: $1_p$ and $1_q$, $2_p$ and $2_q$, etc. The conductors *a*, *b* and *c* are connected to the *p*-cores and the conductors *d*, *e*, and *f* are connected to the *q*-cores. Each *p*-core is in addition coupled inductively by means of a short-circuit winding 10 with the associated *q*-core.

Before the operation of the memory matrix of FIG. 3 will be described in detail, the operation and the properties of a separate memory element will now be described with reference to FIG. 4, a notation being deduced which will be used in the description of FIG. 3.

Figure 4:
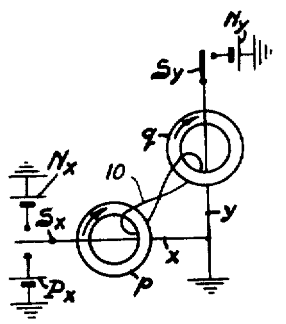
FIG. 4 shows diagrammatically a memory element such as used in the memory matrix of FIG. 3, and FIG. 5 also shows diagrammatically one embodiment of a memory matrix according to the invention.

In FIG. 4, *p* and *q* are cores having magnetisation characteristics which for the time being are assumed to have the shape as indicated in full lines in FIG. 2. Core *p* is coupled to a conductor *x*, which may be connected by means of a switch $S_x$ to the positive terminal of a battery $P_x$ or to a negative terminal of a battery $N_x$. The core *q* is coupled to a conductor *y*, which may be connected by means of a switch $S_y$ to the negative terminal of a battery $N_y$. The cores *p* and *q* are in addition connected together by means of a short-circuit winding 10. The winding direction of winding 10 is chosen to be such that, if a negative pulse is supplied to the conductor *x*, the resulting flux variations in the core *p* lead to currents in the short-circuit winding 10, having a direction such that the magnetic fields produced by these currents in the core *q* have the same direction as that of the magnetic fields produced by a positive current pulse in the conductor *y*. Similarly, a negative current pulse through the conductor *y* leads to currents in the short-circuit winding, having a direction such that the magnetic fields produced by these currents in the core *p* have the same direction as that of the magnetic fields produced by a positive current pulse in the conductor *x*.

Such a memory element may occupy several conditions, since the core *p* and the core *q* may occupy the condition of remanence $\Phi_1$ or $\Phi_2$. Hereinafter (1.1) indicates the situation in which the two cores are in the condition $\Phi_1$, (0.0) indicates the situation in which the two cores are in the condition $\Phi_2$, (1.1) indicates the situation in which the core *p* is in the condition $\Phi_1$ and the core *q* in the condition $\Phi_2$, and (0.1) indicates the situation in which the core *p* is in the condition $\Phi_2$ and the core *q* in the condition $\Phi_1$.

The batteries $N_x$ and $N_y$, when connected to the conductors *x* and *y*, respectively, provide currents having a value of $-i$; and the battery $P_x$, when connected to the conductor *x*, provides a current having a value of *i*. These currents may be given a pulsatory character by causing the switches $S_x$ and $S_y$ to switch on a battery only temporarily. The absolute value of these currents is at least equal to $i_1$ (see FIG. 2).

$[i_p,i_q]$ indicates hereinafter that conductor *x* is temporarily traversed by a current $i_p$ and at the same time conductor *y* is traversed by a current $i_q$. Both $i_p$ and $i_q$ thus may have the value $-i$ or 0, and $i_p$ in addition may have the value *i*.

$(\alpha,\beta)[i_p,i_q]=(\gamma,\delta)$ indicates hereinafter that the memory element initially is in the condition $(\alpha,\beta)$, wherein $\alpha$ and $\beta$ are equal to 1 or 0, that at the same time pulsatory currents $i_p$ and $i_q$ are produced in the conductors *x* and *y*, respectively, and that the memory element, after these currents have ceased, is in the situation $(\gamma,\delta)$, wherein $\gamma$ and $\delta$ are also equal to 1 or 0.

The different cases which occur in the memory matrix shown in FIG. 3 will now be considered in succession.

$$(1.0)[-i,0]=(0.1)$$

The memory element thus initially is in the situation in which the core *p* occupies the condition of remanence $\Phi_1$ and the core *q* occupies the condition of remanence $\Phi_2$. A current pulse $-i$ traverses only the current conductor *x* and, this is achieved by causing the switch $S_x$ to switch on temporarily the battery $N_x$. Said current pulse primarily causes the core *p* to pass from the condition $\Phi_1$ to the condition $\Phi_2$ (see FIG. 2) and produces secondarily, on account of the considerable flux variation during this passage, a material current pulse in the winding 10, which current pulse exerts upon the core *q* the same influence as a positive current pulse does in the conductor *y*. Consequently, this implies that the core *q* passes from the initial condition $\Phi_2$ to the condition $\Phi_1$.

$$(1,0)[0,-i]=(1,0)$$

In this case the current pulse $-i$ through conductor *y* drives the core *q* from the condition of remanence $\Phi_2$ farther into the negative saturation, so that the initial condition is maintained after the current pulse ceases; however, the resulting flux variations are too small to affect the core *p*, so that the initial condition is also maintained in the core *p*.

$$(1,0)[i,0]=(1,0)$$

In this case the current pulse *i* through the conductor *x* drives the core *p* from the condition of remanence $\Phi_1$ farther into the positive saturation, so that here also after the current pulse ceases, the initial condition is maintained. As before the resulting flux variations are too small to affect the core *p*.

$$(1,0)[-i,-i]=(0.0)$$

Owing to the current pulse $-i$ through the conductor $x$, the core $p$ passes from the condition $\Phi_1$ to the condition $\Phi_2$. The influence of the resulting current pulse in the winding 10 is in this case compensated by the negative current pulse in conductor $y$, with the result that in the core $q$ the original condition $\Phi_2$ is maintained.

$$(0,0)[-i,0]=(0,0)$$

The current pulse $-i$ through the conductor $x$ drives the core $p$ from the condition $\Phi_2$ farther into the negative saturation, so that the initial condition is maintained after the current pulse ceases. The resulting flux variation is, as before, too small to affect the core $q$.

$$(0,0)[0,-i]=(0,0)$$

This case is fully analogous to the preceding one and the initial condition is maintained in both cores.

$$(0,0)[i,0]=(1,0)$$

The positive current pulse $i$ through the conductor $x$ causes the core $p$ to pass from the condition $\Phi_2$ into the condition $\Phi_1$. Consequently, a current pulse is produced in the winding 10, which pulse has an influence equal to that of a negative current pulse in the conductor $y$. From FIG. 2 it may be seen again that the core $q$ maintains its original condition.

$$(0,1)[0,-i]=(1,0)$$

This case is fully analogous to the case $$(1,0)[-i,0]=(0,1)$$

on the understanding that the cores $p$ and $q$ and the conductors $x$ and $y$ have changed their functions.

$$(0,1)[i,0]=(1,0)$$

The current pulse $i$ through the conductor $x$ causes the core $p$ to pass from the condition $\Phi_2$ to the condition $\Phi_1$. Consequently, a current pulse is produced in the winding 10, which pulse has an influence equal to that of a negative current pulse in conductor $y$. From FIG. 2 it follows that the core $q$ passes from the original condition $\Phi_1$ to the condition $\Phi_2$.

Summarising:

$$(1,0)[-i,0]=(0,1)$$
$$(1,0)[0,-i]=(1,0)$$
$$(1,0)[i,0]=(1,0)$$
$$(1,0)[-i,-i]=(0,0)$$
$$(0,0)[-i,0]=(0,0)$$
$$(0,0)[0,-i]=(0,0)$$
$$(0,0)[i,0]=(1,0)$$
$$(0,1)[0,-i]=(1,0)$$
$$(0,1)[i,0]=(1,0)$$

From the foregoing it appears that the current pulse is called negative if this current pulse influences a core in such manner that it passes from a condition $\Phi_1$ to a condition $\Phi_2$, wherein $\Phi_1$ represents the flux in a core corresponding to the condition of remanence indicated as positive in FIG. 2 and $\Phi_2$ represents the flux in a core corresponding to the condition of remanence indicated as negative in FIG. 2. In FIG. 2 such a current pulse has a direction corresponding to the negative $i$-axis.

Now, in a concrete case, one always has freedom to call a determined flux direction in the core positive and the other negative. In FIG. 4, the direction indicated by arrows is regarded as positive. In this case, for example, those terminals of the batteries $N_x$ and $N_y$ which are not connected to earth are actually negative with respect to earth. However, if the direction indicated by arrows would be regarded as negative, those terminals of the said battery which are not connected to earth would actually have to be positive with respect to earth.

In order to avoid a complicated description, a current pulse traversing a conductor coupled to a core will hereinafter, in conformity with the foregoing, be called negative if this current pulse brings the core from the condition of remanence regarded as positive into the condition of remanence regarded as negative, and furthermore that terminal of the battery which is not connected to earth and which supplies the current pulse to the conductor, will be regarded as negative, although this is actually by no means necessary.

It appears from the foregoing that the absolute value of the current pulse supplied to a conductor is always at least equal to $i_1$ (see FIG. 2). Essential for proper operation of the memory element of FIG. 4 is only that the flux variation is considerable when a core passes from one condition of remanence to the other and that the flux variation is small when a core is driven from a condition of remanence into the associated field of saturation. This implies that the material of the cores in the memory element of FIG. 4 need satisfy only the condition that the relationship between remanence flux [$\Phi_1$ or $\Phi_2$] and saturation flux [$\Phi_5$ or $\Phi_3$] approaches as closely as possible the value 1. A magnetisation characteristic substantially rectangular as defined above, which is required for the memory elements of a memory matrix as shown in FIG. 1, is thus by no means necessary. The core material may have a magnetisation characteristic as indicated by a dash-and-dot line in FIG. 2.

In FIG. 3, the conductors $a$, $b$ and $c$ are connected to devices A, B and C, which each can supply to the associated conductor a positive or a negative current pulse having a value $i$. Such a device may comprise, for example, two batteries and a switch as indicated for the memory element of FIG. 4. In practice, the switches are generally of the electronic type and the batteries may be replaced by impedances across which voltages occur originating from other devices.

The conductors $d$, $e$ and $f$ are connected to devices D, E and F, which each can supply a negative current pulse $-i$ to the associated conductor. Analogous remarks as for the composition of devices A, B and C apply to the devices D, E and F.

It is assumed hereinafter that a "1" of the coded information is characterized by the situation (1,0), which a memory element can occupy, and a "0" by the situation (0,0).

The initial condition of all memory elements is assumed to be (0,0).

Assume the information which the memory matrix must contain to be of the form:

| | | |
|---|---|---|
| "1" | "1" | "0" |
| "0" | "0" | "1" |
| "1" | "0" | "1" |

wherein a symbol "1" or "0" in the above scheme in a determined row and in a determined column corresponds to the desired information in the corresponding memory element of the memory matrix of FIG. 3.

At first a positive pulse is supplied to the conductor $a$. Thus, for all memory elements of the first row, there applies the process characterised by $$(0,0)[i,0]=(1,0)$$

All memory elements of the first row, after the current pulse ceases, thus occupy the situation (1,0) corresponding to a "1" of the coded information.

Subsequently, a negative current pulse is supplied at the same time to the conductors $a$ and $f$. For the memory elements 1 and 2 there now applies the process characterised by $$(1,0)[-i,0]=(0,1)$$

and for the memory element 3

$$(1,0)[-i,-i]=(0,0)$$

It is mentioned that, if the conductors $d$ and $e$ in this case are not open lines (contrary to the case, for example, when the devices D and E are designed as a switch and a battery as shown in FIG. 4) the passages of the cores $\mathbf{1}_q$ and $\mathbf{2}_q$ from the condition $\Phi_2$ to the condition $\Phi_1$ bring about negative pulses in said conductors. The memory elements in the columns concerned which are associated with the second and third rows still occupy the situation (0,0). However, as may appear from:

$$(0,0)[0,-i]=(0,0)$$

the said current pulse has no influence upon these memory elements.

The conductors will not be open lines, for example, if the current pulses in these conductors which originate from the devices A, B etc. are produced by the action of voltages supplied to impedances connected to these conductors. An example of the latter situation is if these voltages are supplied to the primary winding of a transformer, the secondary winding of which is connected in series with such a conductor.

The memory element 3 now contains a "0," but the memory elements 1 and 2 still do not occupy their correct positions.

For this purpose, a negative current pulse is again supplied to the conductors *d, e* and *f*. The memory element 3 thus undergoes the process $$(0,0)[0,-i]=(0,0)$$

and thus retains the information "0." The memory elements 1 and 2 undergo the process $$(0,1)[0,-i]=(1,0)$$

and thus contain, after this process ceases, exactly the desired information "1."

The passage in a *p*-core from the condition $\Phi_2$ to the condition $\Phi_1$ brings about likewise a negative current pulse in the associated row conductor, if this conductor is not an open line. This pulse likewise has no influence upon the other memory elements, which occupy the situation (0,0), since $(0,0)[-i,0]=(0,0)$.

The memory elements 4, 5, 6, 7, 8 and 9 keep maintaining themselves in the situation (0,0), since the processes to which these memory elements are subjected are: For the memory elements 6 and 9 the successive processes:

$$(0,0)[0,-i]=(0,0)$$

and $$(0,0)[0,-i]=(0,0)$$

and for the cores 4, 5, 7 and 8 the single process:

$$(0,0)[0,-i]=(0,0)$$

It will be evident that the last-mentioned negative current pulse actually need be supplied only to the conductors *d* and *e* instead of to all column conductors, if desired even in succession, in order to obtain the desired effect. But supplying the current pulse to all three column conductors affords the advantage that no choice need be made between the three conductors.

Subsequently, the second row is registered. At first, a positive pulse is supplied to the conductor *b*. The cores 4, 5 and 6 then occupy the situation (1,0).

Subsequently, negative current pulses are supplied simultaneously to the conductors *b*, *d* and *e*. The memory elements 4 and 5 thus assume again the condition (0,0) and the memory element 6 the condition (0,1). Supplying a negative pulse to the three column conductors brings the memory element 6 into the situation (1,0).

It will again be evident that, as an alternative, the memory elements 4 and 5 may be brought in succession into the situation (0,0) by first supplying simultaneously negative current pulses to the conductors *b* and *d* and then supplying simultaneously negative current pulses to the conductors *b* and *e*.

What is now the influence of the negative current pulses in the column conductors upon the memory elements of the first row? For this the following processes apply:

$$(1,0)[0,-i]=(1,0)$$

and $$(0,0)[0,-i]=(0,0)$$

respectively from which it appears that the first row elements do not vary under the action of the said current pulses.

The registration of the desired information in the third row will now be clear. At first, a positive current pulse is supplied to the conductor *c*. Subsequently, negative pulses are supplied to the conductors *c* and *e* and, finally, another negative pulse is supplied to all three column conductors *d*, *e* and *f*.

From the foregoing it appears that each memory element of the memory matrix during registration undergoes analogous processes as the memory element shown in FIG. 4. Consequently, in this case also a core need not distinguish between a current pulse $i_1$ and a current pulse $\frac{1}{2}i_1$ (see FIG. 2). The choice of the current pulses $i$ and $-i$ as used in the memory matrix of FIG. 3 is thus by no means critical and the magnetisation characteristics need not be wholly identical either. Furthermore it will be evident that substantially rectangular magnetisation characteristics of the cores are not required and that it suffices for the ratio between the remanent flux of the core material and the saturation flux to approach as closely as possible the value 1.

Furthermore, there is the advantage that the registration of the information in the whole row (which in practice is generally built up from more than three memory elements) may take place in three sequential processes, whereas in known memory matrices the number of processes is equal to the number of memory elements in one row.

The information is read out as follows:

A negative current pulse is supplied to the conductor *a*. The memory elements 1 and 2, which in the example chosen occupy the condition (1,0), pass to the condition (0,1), since $$(1,0)[-i,0]=(0,1)$$

and the memory element 3, which occupies the condition (0,0), remains in this condition, since $$(0,0)[-i,0]=(0,0)$$

The transition of the memory elements 1 and 2 from the situation (1,0) to the situation (0,1) brings about voltage pulses across the reading out windings $g_1$ and $g_2$, which are coupled to the *q*-cores of these memory elements, which voltage pulses are supplied to further equipment (not shown). However, a voltage pulse doe not occur across the output winding $g_3$.

The reading-out windings may otherwise also be coupled to the *p*-cores. Coupling with the *q*-cores is preferable, however, in view of the fact that, if a memory element occupies the condition (0,0), the flux variations in the *p*-cores (from $\Phi_2$ to $\Phi_3$ and back, see FIG. 2) which still occur by the action of the negative current pulse in the row-conductor are greater than the flux variations in the *q*-cores which occur under the action of the last-mentioned flux variations, so that the difference between the output voltages which occur if a "1" is registered and the output voltages which occur if a "0" is registered, when the windings are coupled to the *q*-cores is greater than when coupled to the *p*-cores.

It is mentioned that negative current pulses occur in the conductors *d* and *e* under the action of said transitions unless these conductors constitute open lines during reading out, but these current pulses do not affect the other memory elements coupled to said conductors, since, as may appear from the process $$(1,0)[0,-i]=(1,0)$$

and from the process $$(0,0)[0,-i]=(0,0)$$

the situation of the other memory elements are not varied thereby.

By supplying negative pulses to all column conductors $d$, $e$ and $f$, the memory elements 1 and 2 return from the situation (0,1) to the situation (1,0); the memory element 3 then remains, as before, in the initial situation.

The rows 2 and 3 are read out in an analogous manner. In this case also, negative current pulses which may occur in the column conductors do not affect those memory elements which occupy the conditions (1,0) and (0,0), whereas these current pulses cause a memory element of a row which has already been read out but which has not been restored to its initial condition, of which memory element occupies the condition (0.1), to be brought back into the situation (1,0), since $$(0,1)[0,-i][=(1,0)$$

which naturally is not objectionable.

In view of the latter, it may be mentioned that it is thus possible to read out a determined row and subsequently to restore this row to its initial condition before proceeding to a subsequent row, but that it is also possible first to read out all rows and subsequently to restore them together to their original conditions by supplying negative pulses to the column conductors.

It thus appears that, in contradistinction to known memory matrices, the information of a whole row may be obtained at the same time. If desired, this information may naturally be obtained in succession by repeating the above-mentioned process in a determined row and registering in succession the voltage pulse which may cross an output conductor.

Since reading out is effected in a similar manner as registering, in this case also the value for the current pulses is not critical and for reading out it is also not absolutely necessary for the characteristic curves of the cores to be completely identical or substantially rectangular.

It also appears that, when the information is read out, it is not lost in a memory matrix according to the invention, since by supplying a negative pulse to all column conductors after one or more rows have been read out, the situation as it was before reading out is completely restored, which is in contradistinction to known devices.

If subsequently, new information is to be registered in the memory matrix, it would be possible first to bring all memory elements again into the situation (0,0) by supplying negative pulses both to the column conductors and the row conductors.

However, this is by no means necessary. As has been described in the foregoing, during registration of information in a row, at first a positive current pulse is supplied to the current conductor associated with the row concerned.

Starting from a situation (0,0), each memory element thus comes into the situation (1,0), since $$(0,0)[i,0]=(1,0)$$

But this is also the case if a memory element is in the situation (1,0) or (0,1) since $$(1,0)[i,0]=(1,0)$$

and $$(0,1)[i,0]=(1,0)$$

It can be proved that the information of a row may alternatively be read out by supplying a positive current pulse to the row conductor concerned. The reading-out windings must in this case be connected to the $p$-cores. However, it can also be proved that in this case all memory elements of the row concerned assume the same condition, so that the information for the memory matrix is lost.

Furthermore, it may be proved that the information of a column may be read out by supplying a positive current pulse to the column conductor concerned. In the first place, this requires for the column conductors the use of a source which can supply a positive current pulse, but in this case also the information is lost.

However, it is possible for the information of a column to be read out without being destroyed by coupling the $p$-cores of the memory elements associated with a determined column to a separate column conductor which has a negative pulse supplied to it for reading out. In this case the information is not lost; the information may be restored, for example, by supplying a negative current pulse to the associated column conductor coupled to the $q$-cores.

In FIG. 3, each memory element has a reading-out winding of its own; $g_1$, $g_2$ etc. However, it is alternatively possible for the memory elements associated with a determined column to be provided with a common reading-out winding. The memory elements associated with a row conductor which is not excited by a negative reading-out pulse are influenced by these common reading-out windings in the same manner as by the column conductors in the case referred to above, in which each memory element has a reading-out winding of its own, from which it follows that this influencing has no interfering action.

It is even possible to utilise the column conductors themselves as reading windings. During reading out, the column conductors are not connected to the associated batteries or analogous voltage sources of the devices D, E and F, so that the voltages which occur across such conductors during reading out may be utilised by causing the switch connected to such a conductor to switch into circuit the input terminal of e.g. a registering device or to supply thereto the voltage which occurs across an impedance connected to this conductor.

Figure 5:
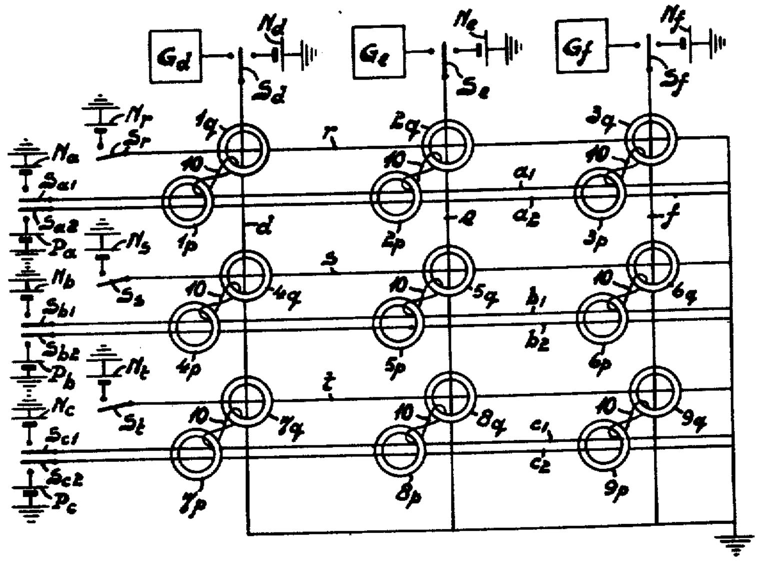

FIG. 5 shows one embodiment of a memory matrix in which the column conductors are also used as reading-out windings. For this purpose, the column conductors are connected to switches $S_d$, $S_e$ and $S_f$, which can connect the conductors to voltage sources $N_d$, $N_e$ and $N_f$ or to registering devices $G_d$, $G_e$ and $G_f$. Furthermore, in the embodiment shown in FIG. 5, the row conductors are not single, as in FIG. 4, but of the double type, one set of row conductors $a_1$, $b_1$ and $c_1$ serving only to convey negative current pulses and the other set of row conductors $a_2$, $b_2$ and $c_2$ serving only to convey positive current pulses. For this purpose, the row conductors $a_1$, $b_1$ and $c_1$ are connected to switches $S_{a1}$, $S_{b1}$ and $S_{c1}$, which can connect the conductors to voltage sources $N_a$, $N_b$ and $N_c$, thus supplying negative current pulses, and the row conductors $a_2$, $b_2$ and $c_2$ are connected to switches $S_{a2}$, $S_{b2}$ and $S_{c2}$, which can connect the conductors to voltage sources $P_a$, $P_b$ and $P_c$, thus supplying positive current pulses. It will be evident that this has no influence at all upon the operation of the memory matrix; only it is now not necessary for supplying negative or positive pulses to operate at the same time a switch suitable for conveying comparatively high currents.

Furthermore, in FIG. 5, the $q$-cores of the rows are provided with separate row conductors, viz. the conductors $r$, $s$ and $t$. Both during registering information in a determined row and during reading-out information from a determined row, negative current pulses are preferably supplied simultaneously to all three column conductors. In each case this is effected to restore to the situation (1,0) those memory elements of the row concerned which during registration or reading out have assumed the situation (0,1).

By supplying a negative current pulse to the row conductor which is associated with this row and coupled to the $q$-cores, the same result is obtained, but with the advantage that the influence thereof upon the memory elements in the non-treated rows is considerably smaller (and, if the column conductors are open lines, is even zero), so that the requirement that the relationship between remanent flux and saturation flux of the core material must approach as closely as possible the value 1, may be a little less severe.

For this purpose the conductors $r$, $s$ and $t$ are connected to switches $S_r$, $S_s$ and $S_t$, which can connect the conductors to voltage sources $N_r$, $N_s$ and $N_t$, which thus can supply negative current pulses.

It will be evident that in the foregoing the words "column" and "row" may everywhere be interchanged.

Finally, it is mentioned that the number of three memory elements in a row and in a column has been chosen only by way of example and that the number of memory elements in a row need not be equal to the number of memory elements in a column. In addition, the invention is not limited to the specific circuits and components illustrated, since modifications thereof may be suggested by those skilled in the art without departing from the spirit of the invention.

What is claimed is:

1. A memory matrix comprising a plurality of static memory elements arranged in rows and columns, each said memory element comprising a pair of memory cores of highly remanent ferromagnetic material, means for inductively coupling said cores together, said means comprising a low impedance coupling loop, a first plurality of input conductors respectively inductively coupled solely to the first ones of said cores of each memory element in each of said rows, and a second plurality of input conductors respectively inductively coupled solely to the second ones of said cores of each memory element in each of said columns.

2. A memory matrix as claimed in claim 1, including means connected for selectively applying both positive and negative current pulses to said first plurality of input conductors, and means connected for selectively applying current pulses of given polarity to said second plurality of input conductors.

3. A memory matrix as claimed in claim 1, including a third plurality of input conductors respectively inductively coupled to said first cores of the memory elements in each row, means connected to selectively apply positive current pulses to said first plurality of input conductors, means connected to selectively apply negative current pulses to said third plurality of input conductors, and means connected to selectively apply current pulses of given polarity to said second plurality of input conductors.

4. A memory matrix as claimed in claim 1, in which each of said second cores has a read-out winding inductively coupled thereto.

5. A memory matrix as claimed in claim 4, in which all of said read-out windings in each column are connected together to form a common read-out winding for each of said columns.

6. A memory matrix as claimed in claim 1, including read-out circuit means, and switching means for selectively connecting said second plurality of input conductors to said read-out circuit means.

7. A memory matrix as claimed in claim 1, including means for applying a positive current pulse to one of said first plurality of input conductors coupled to a selected one of said rows, means for subsequently applying a negative current pulse to one of said first plurality of input conductors coupled to said selected row, and means for simultaneously applying a negative current pulse to at least one of said second plurality of input conductors.

8. A memory matrix as claimed in claim 7, including means for subsequently applying a negative current pulse to the remaining ones of said second plurality of input conductors.

9. A memory matrix as claimed in claim 7, including means for subsequently applying negative current pulses simultaneously to all of said second plurality of input conductors.

10. A memory matrix as claimed in claim 7, including a third plurality of conductors respectively inductively coupled to said second ones of the cores in each of said rows, and means for subsequently applying a negative current pulse to the one of said third plurality of conductors which is associated with said selected row.

11. A memory matrix as claimed in claim 1, including a read-out circuit connected to apply a current pulse of given polarity to a selected one of said first plurality of input conductors.

12. A memory matrix as claimed in claim 11, including means to subsequently apply pulses of said given polarity to all of said second plurality of conductors.

13. A memory matrix as claimed in claim 11, including a third plurality of conductors respectively inductively coupled to said second ones of the cores in each of said rows, and means for subsequently applying a negative current pulse to the one of said third plurality of conductors which is associated with said selected row.

14. A memory matrix as claimed in claim 1, including a plurality of read-out conductors respectively inductively coupled to said first ones of the cores in each of said columns, and means for applying a read-out current pulse to a selected one of said read-out conductors.

15. A memory matrix as claimed in claim 14, including means to subsequently apply a current pulse to the one of said second plurality of input conductors which is associated with the memory element to which said read-out current pulse is applied by said selected read-out conductor.

16. A digital information storage system comprising a matrix arrangement of magnetic core storage devices wherein each core storage device employed for the registration of each digit comprises two separate magnetic cores, a first core and a second core, each of material capable of assuming bistable states of magnetisation, and electromagnetic coupling means individual to each storage device coupling said first and second cores magnetically to induce magnetisation in either one of said cores upon reversal of the magnetisation direction from one stable state to the other in either sense in the other of said cores, a plurality of first common windings coupling said first cores of said storage devices together in discrete groups and a plurality of second common windings coupling said second cores of said storage devices together in discrete groups with only one storage device common to any one first and any one second common winding.

References Cited in the file of this patent

UNITED STATES PATENTS

| | | |
|---|---|---|
| 2,666,151 | Rajchman | Jan. 12, 1954 |
| 2,691,155 | Rosenberg et al. | Oct. 5, 1954 |
| 2,696,600 | Serrell | Dec. 7, 1954 |
| 2,709,248 | Rosenberg | May 24, 1955 |
| 2,719,961 | Karnaugh | Oct. 4, 1955 |
| 2,734,185 | Warren | Feb. 7, 1956 |
| 2,768,367 | Rajchman | Oct. 23, 1956 |
| 2,769,925 | Saunders | Nov. 6, 1956 |

FOREIGN PATENTS

| | | |
|---|---|---|
| 721,669 | Great Britain | Jan. 12, 1955 |

OTHER REFERENCES

Publication 1, IRE Convention Record, 1955, National Convention, Part 4, Computers and Information Theory, pages 64–69.